US011901117B2

(12) United States Patent
Nagaki et al.

(10) Patent No.: US 11,901,117 B2
(45) Date of Patent: Feb. 13, 2024

(54) METHOD FOR MANUFACTURING POWDER MAGNETIC CORE

(71) Applicant: TOYOTA JIDOSHA KABUSHIKI KAISHA, Toyota (JP)

(72) Inventors: Hiroto Nagaki, Toyota (JP); Kazumichi Nakatani, Toyota (JP); Kohei Ishii, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 17/343,941

(22) Filed: Jun. 10, 2021

(65) Prior Publication Data

US 2022/0020531 A1 Jan. 20, 2022

(30) Foreign Application Priority Data

Jul. 17, 2020 (JP) ................................ 2020-122709

(51) Int. Cl.

*H01F 41/02* (2006.01)
*B22F 3/03* (2006.01)
*B22F 7/00* (2006.01)
*B22F 7/02* (2006.01)

(52) U.S. Cl.

CPC ............ *H01F 41/0246* (2013.01); *B22F 3/03* (2013.01); *B22F 7/008* (2013.01); *B22F 7/02* (2013.01); *B22F 2301/35* (2013.01); *B22F 2302/45* (2013.01)

(58) Field of Classification Search

CPC ......... B22F 3/02–2003/033; B22F 7/02; B22F 2007/042; H01F 41/0246
See application file for complete search history.

(56) References Cited

U.S. PATENT DOCUMENTS 6,348,265 B1 * 2/2002 Jansson ..................... B22F 1/16 148/306
2008/0258102 A1 * 10/2008 Hirose ................ C22C 33/0228 252/62.51 R (Continued)

FOREIGN PATENT DOCUMENTS

CN 204946633 U * 1/2016
JP H6-293015 A 10/1994
JP 2000504785 A * 4/2000

(Continued)

*Primary Examiner* — Sally A Merkling
*Assistant Examiner* — Austin Pollock
(74) *Attorney, Agent, or Firm* — Oblon, McClelland, Maier & Neustadt, L.L.P.

(57) ABSTRACT

A method for manufacturing a powder magnetic core, the method including: forming a soft magnetic powder (SMP) layer by putting an SMP having a surface on which an insulating coating film is formed into a space surrounded by a lower punch and a die; forming a pressed powder by compressing the SMP layer in the die by the lower punch and an upper punch; and causing the pressed powder and the die to slide relative to each other and then removing the pressed powder from the die is provided. In forming the SMP layer, a different powder different from the SMP is put into the space before and after the SMP is put into the space and a different powder layer having a spring back rate higher than that of the SMP layer by 0.6-1.1% is formed on upper and lower sides of the SMP layer.

1 Claim, 6 Drawing Sheets

(56) References Cited

U.S. PATENT DOCUMENTS

| | | | | |
|---|---|---|---|---|
| 2014/0191839 A1* | 7/2014 | Sato | .......................... | H01F 3/08<br>336/221 |
| 2020/0186929 A1* | 6/2020 | Kim | ......................... | H04R 9/06 |

FOREIGN PATENT DOCUMENTS

| | | | | |
|---|---|---|---|---|
| JP | 2005-317679 | A | | 11/2005 |
| JP | 2013-027896 | A | | 2/2013 |
| JP | 2014045107 | A | * | 3/2014 |
| JP | 2014072367 | A | * | 4/2014 |
| JP | 2015-70028 | A | | 4/2015 |

* cited by examiner

METHOD FOR MANUFACTURING POWDER MAGNETIC CORE

CROSS REFERENCE TO RELATED APPLICATIONS

This application is based upon and claims the benefit of priority from Japanese patent application No. 2020-122709, filed on Jul. 17, 2020, the disclosure of which is incorporated herein in its entirety by reference.

BACKGROUND

The present disclosure relates to a method for manufacturing a powder magnetic core.

Japanese Unexamined Patent Application Publication No. 2013-027896 discloses a method for manufacturing a magnetic core including compressing, in a die, a soft magnetic powder having a surface on which an insulating coating film is formed using a lower punch and an upper punch, thereby forming a pressed powder. The insulating coating film is formed to reduce the iron loss.

SUMMARY

The inventors have found the following problem regarding the method for manufacturing the powder magnetic core disclosed in, for example, Japanese Unexamined Patent Application Publication No. 2013-027896.

As disclosed in Japanese Unexamined Patent Application Publication No. 2013-027896, the pressed powder and the die are slid relative to each other and the pressed powder is then removed from the die. At this time, the pressed powder that is about to spring back (be swollen) and the die rub each other, which causes plastic flow to occur in the soft magnetic powder. Therefore, there is a problem that the insulating coating film formed on the surface of the soft magnetic powder may be broken and thus the iron loss of the powder magnetic core may increase.

The present disclosure has been made in view of the above circumstances and provides a method for manufacturing a powder magnetic core capable of reducing the iron loss thereof and having high formability.

A method for manufacturing a powder magnetic core according to one aspect of the present disclosure is a method for manufacturing a powder magnetic core including:

forming a soft magnetic powder layer by putting a soft magnetic powder having a surface on which an insulating coating film is formed into a space surrounded by a lower punch and a die;

forming a pressed powder by compressing the soft magnetic powder layer in the die by the lower punch and an upper punch; and causing the pressed powder and the die to slide relative to each other and then removing the pressed powder from the die, in which in forming the soft magnetic powder layer, a different powder different from the soft magnetic powder is put into the space before and after the soft magnetic powder is put into the space and a different powder layer having a spring back rate higher than that of the soft magnetic powder layer by 0.6-1.1% is formed on upper and lower sides of the soft magnetic powder layer.

In the method for manufacturing the powder magnetic core according to one aspect of the present disclosure, in forming the soft magnetic powder layer, the different powder different from the soft magnetic powder is put into the space before and after the soft magnetic powder is put into the space and the different powder layer having a spring back rate higher than that of the soft magnetic powder layer by 0.6-1.1% is formed on upper and lower sides of the soft magnetic powder layer. Since the spring back rate of the different powder layer is higher than that of the soft magnetic powder layer by 0.6% or larger, rubbing between the soft magnetic powder layer and the die, which occurs when the pressed powder is removed from the die after it is formed, can be prevented. As a result, it is possible to prevent the insulating coating film of the soft magnetic powder from being broken and reduce the iron loss of the pressed powder.

Further, since the difference between the spring back rate of the soft magnetic powder layer and that of the different powder layer is 1.1% or smaller, cracking that occurs in the soft magnetic powder layer, which occurs when the pressed powder is removed from the die, can be prevented.

That is, it is possible to provide a method for manufacturing a powder magnetic core capable of reducing the iron loss thereof and having high formability.

The soft magnetic powder may be a pure iron powder and the insulating coating film may be a phosphoric acid-based chemical conversion film or a silicic acid-based chemical conversion film. This structure is preferable.

The different powder may be a ceramic powder. With the above structure, the difference between the spring back rate of the soft magnetic powder layer and that of the different powder layer can easily be made large.

The different powder layer may be preliminarily compressed in the die by the lower punch and the upper punch after the different powder layer is formed by putting the different powder into the space before the soft magnetic powder is put into the space; and the soft magnetic powder layer may be preliminarily compressed in the die by the lower punch and the upper punch after the soft magnetic powder layer is formed on the different powder layer by putting the soft magnetic powder into the space before the different powder is put into the space again. With the above structure, it is possible to prevent mixture of the soft magnetic powder with the different powder.

According to the present disclosure, it is possible to provide a method for manufacturing a powder magnetic core capable of reducing the iron loss thereof and having high formability.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, specific embodiments to which the present disclosure is applied will be described in detail with reference to the drawings. However, the present invention is not limited to the following embodiments. Further, the following descriptions and drawings are simplified as appropriate for clarity of the descriptions.

First Embodiment

<Method for Manufacturing Powder Magnetic Core According to First Embodiment>

Figure 1:
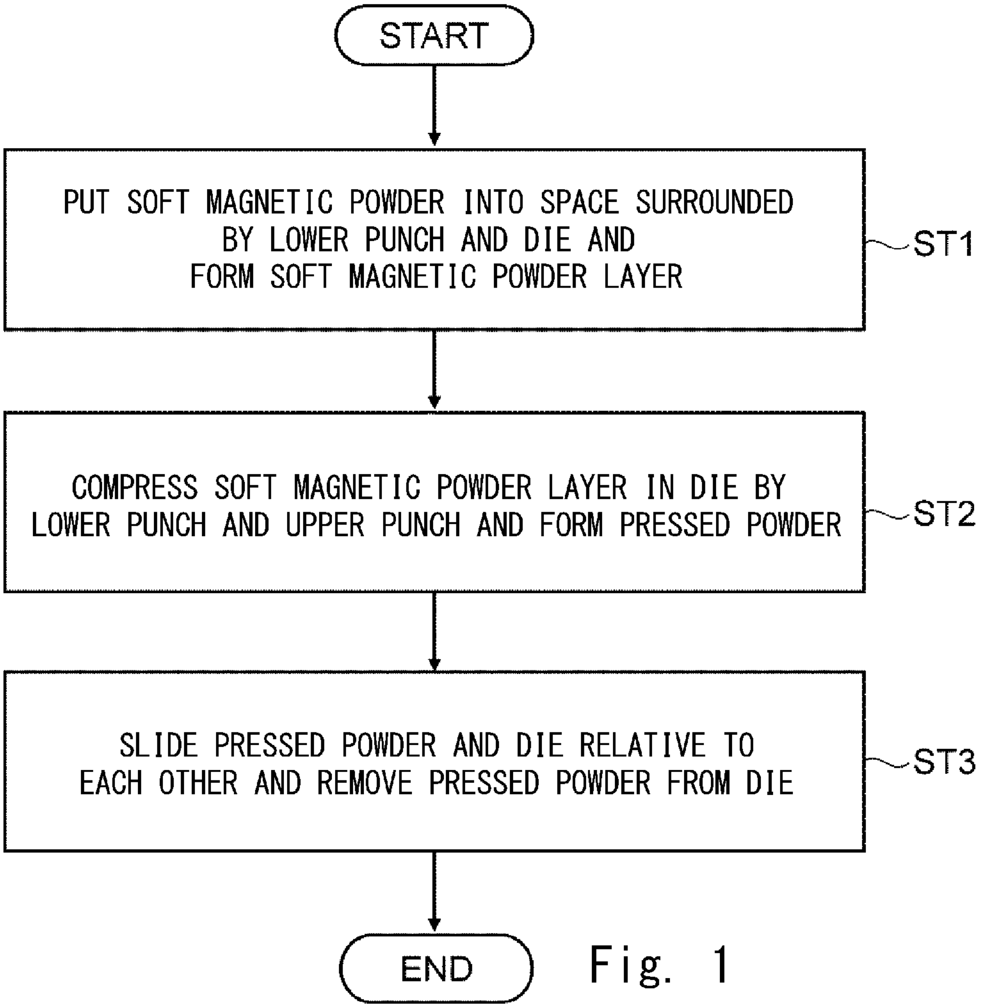
FIG. 1 is a flowchart showing a method for manufacturing a powder magnetic core according to a first embodiment.
Figure 2:
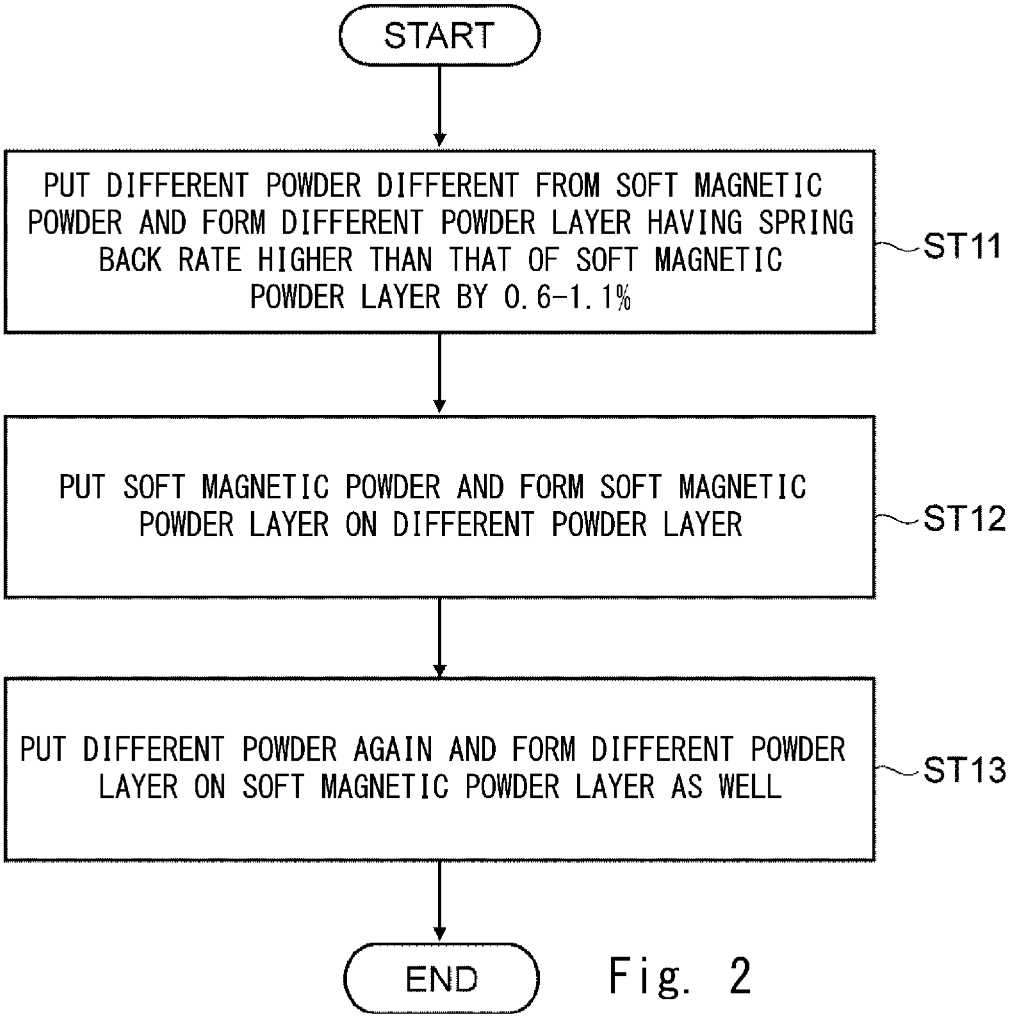
FIG. 2 is a flowchart showing details of Step ST1.
Figure 3:
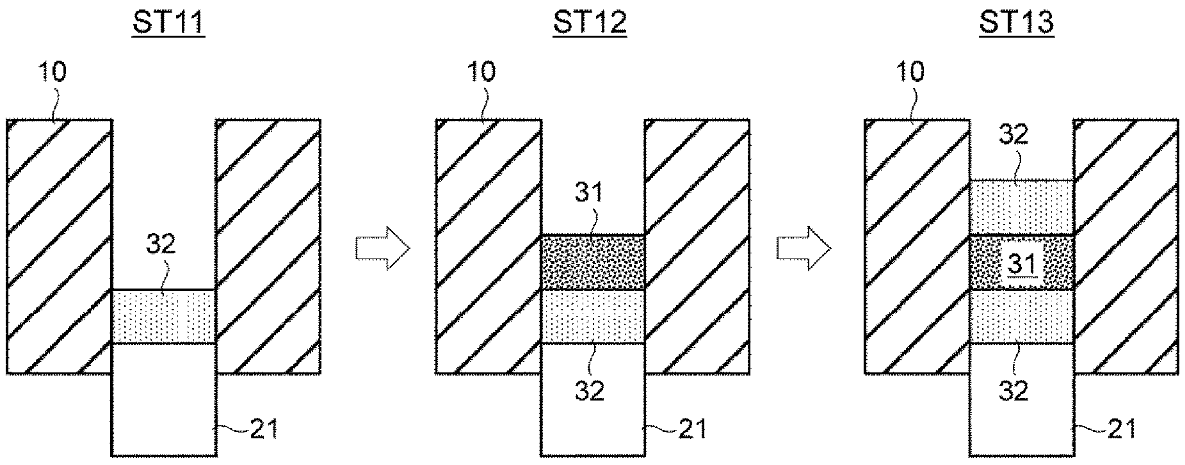
FIG. 3 is a schematic cross-sectional view showing details of Step ST1.
Figure 4:
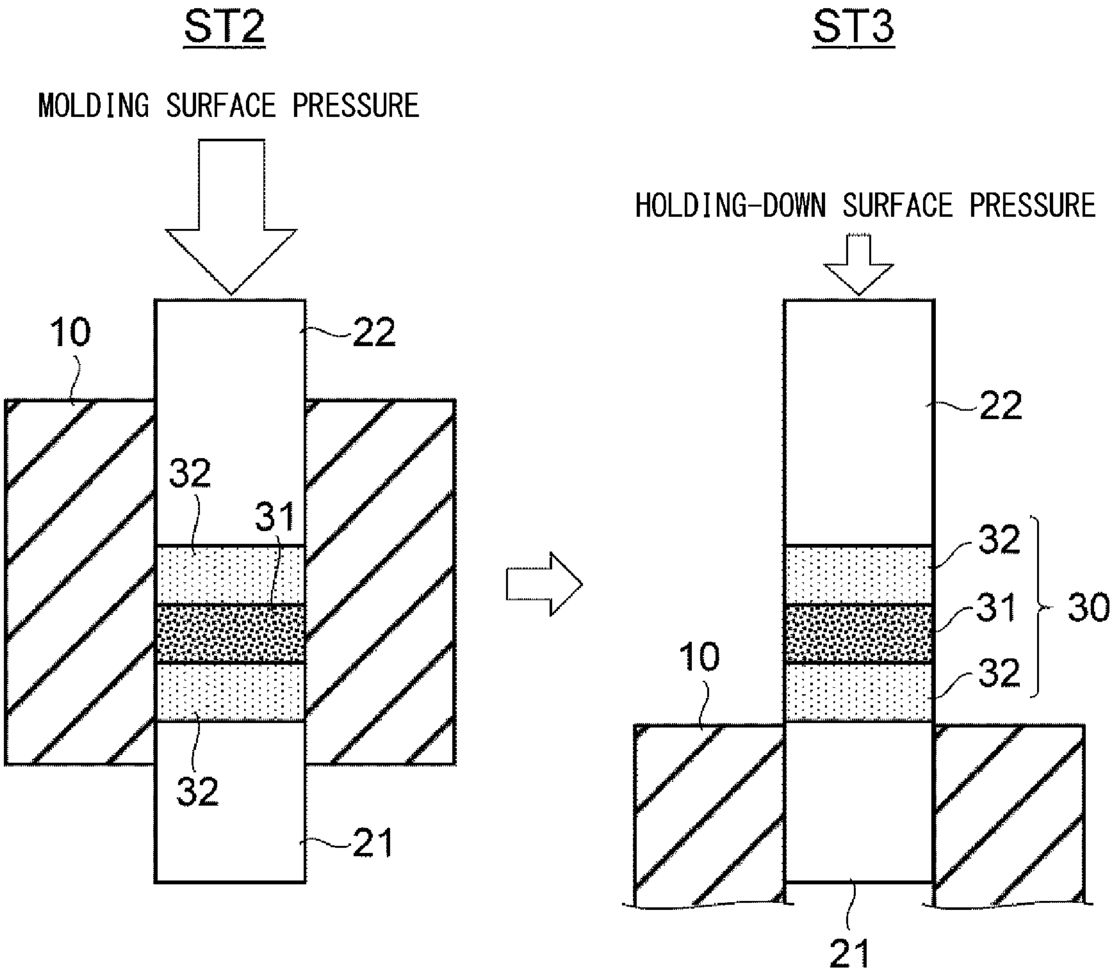
FIG. 4 is a schematic cross-sectional view showing Steps ST2 and ST3.

Referring first to FIGS. 1-4, a method for manufacturing a powder magnetic core according to a first embodiment will be described. FIG. 1 is a flowchart showing the method for manufacturing the powder magnetic core according to the first embodiment. FIG. 2 is a flowchart showing the details of Step ST1. FIG. 3 is a schematic cross-sectional view showing details of Step ST1. FIG. 4 is a schematic cross-sectional view showing Steps ST2 and ST3.

The powder magnetic core to be manufactured may be used, for example, but not particularly limited thereto, as a reactor core.

First, as shown in FIG. 1, a soft magnetic powder having a surface on which an insulating coating film is formed is put into a space surrounded by a lower punch and a die, thereby forming a soft magnetic powder layer (Step ST1).

The insulating coating film formed on the surface of the soft magnetic powder is, for example, a phosphoric acid-based chemical conversion film or a silicic acid-based chemical conversion film. The thickness of the insulating coating film is, for example, 10 nm-1000 nm, and preferably, 100-500 nm.

Further, the soft magnetic powder is made of, for example, but not limited thereto, pure iron, an Fe-based alloy or the like. Pure iron is preferably used to reduce the iron loss.

Further, the soft magnetic powder is, for example, an atomized powder formed of spherical particles. The atomized powder may be a gas atomized powder that is obtained by spraying a raw material dissolved in an inert gas atmosphere such as nitrogen gas and argon gas, or a gas and water atomized powder that is obtained by spraying a dissolved raw material and then cooling the raw material.

The particle diameter of the soft magnetic powder is, for example, but not limited thereto, about 1 to 500 μm, and preferably about 10 to 250 μm. An excessively large particle diameter leads to a decrease in specific resistance or an increase in eddy current loss. On the other hand, an excessively small particle diameter leads to an increase in hysteresis loss or the like, which is not desirable as well. Note that this particle diameter is a particle size that is determined by a screening method that classifies the particle diameter with the use of a screen having a predetermined mesh size.

Referring now to FIGS. 2 and 3, details of Step ST1 will be described. As shown in FIGS. 2 and 3, Step ST1 includes Sub-steps ST11-ST13.

First, as shown in FIGS. 2 and 3, a different powder that is different from the soft magnetic powder is put into a space surrounded by a lower punch 21 and a die 10, and a different powder layer 32 having a spring back rate that is higher than that of a soft magnetic powder layer 31 that is formed later by 0.6-1.1% is formed (Sub-step ST11).

The spring back is a phenomenon in which a pressed powder 30 that will be described later is swollen when it is removed from the die 10 after it is formed by compression (see FIG. 4). The definition of the spring back rate and details of a method of measuring the spring back rate will be described later.

The different powder is a powder different from the soft magnetic powder. The different powder is not particularly limited as long as the spring back rate of the different powder layer 32 is higher than that of the soft magnetic powder layer 31 by 0.6-1.1%. The different powder is, for example, a metal powder made of copper or the like or a ceramic powder made of alumina or the like. The particle diameter of the different powder is, for example, but not limited thereto, about 1-200 μm.

When the difference between the spring back rate of the different powder layer 32 and that of the soft magnetic powder layer 31 is 0.6% or larger, rubbing between the soft magnetic powder layer 31 and the die 10, which may occur when the pressed powder 30 is removed from the die 10 in Step ST3 that will be described later (see FIG. 4), can be prevented. Therefore, it is possible to prevent the insulating coating film of the soft magnetic powder from being broken and reduce the iron loss. In order to obtain this effect, the difference between the spring back rate of the different powder layer 32 and that of the soft magnetic powder layer 31 is preferably 0.7% or larger, and more preferably 0.8% or larger.

On the other hand, if the difference between the spring back rate of the different powder layer 32 and that of the soft magnetic powder layer 31 is too large, when the pressed powder 30 is removed from the die 10 (see FIG. 4), cracking occurs in the soft magnetic powder layer 31. By setting the difference between the spring back rate of the different powder layer 32 and that of the soft magnetic powder layer 31 to 1.1% or smaller, the cracking of the soft magnetic powder layer 31 can be prevented.

When the different powder layer 32 is formed, after the different powder is put into the space, the different powder layer 32 may be preliminarily compressed using the upper punch 22 shown in FIG. 4, although this treatment is not shown in FIG. 4. It is therefore possible to prevent the soft magnetic powder that will be put into the space later from being mixed with the different powder. The pressure of the preliminary compression of the different powder layer 32 may be as low as, for example, about a holding-down surface pressure. To be more specific, the pressure may be, for example, a pressure equal to or smaller than 10 MPa.

Next, as shown in FIGS. 2 and 3, the soft magnetic powder is input into the space surrounded by the lower punch 21 and the die 10 to form the soft magnetic powder layer 31 on the different powder layer 32 (Sub-step ST12).

When the soft magnetic powder layer 31 is formed as well, after the soft magnetic powder is put into the space, the soft magnetic powder layer 31 may be preliminarily compressed using the upper punch 22 shown in FIG. 4, although this treatment is not shown in FIG. 4. It is possible to prevent the different powder that is put into the space later from being mixed with the soft magnetic powder. The pressure of the preliminary compression of the soft magnetic powder layer 31 is the same as that of the different powder layer 32.

Next, as shown in FIGS. 2 and 3, the different powder is put into the space surrounded by the lower punch 21 and the die 10 again to form the different powder layer 32 on the soft magnetic powder layer 31 again (Sub-step ST13).

As described above, in Step ST1, before and after the soft magnetic powder is put into the space surrounded by the lower punch 21 and the die 10, the different powder having a spring back rate that is higher than that of the soft magnetic powder by 0.6-1.1% is put into the above space. That is, the different powder layer 32 is formed on the upper and lower sides of the soft magnetic powder layer 31.

Referring once again to FIG. 1, the description will be continued. Steps ST2 and ST3 will be described later with reference to FIG. 4 as well as FIG. 1.

After Step ST1, as shown in FIGS. 1 and 4, the soft magnetic powder layer 31 is compressed by the lower punch 21 and the upper punch 22 in the die 10, thereby forming the pressed powder 30 (Step ST2).

To be more specific, as shown in FIG. 4, the upper punch 22 is lowered to compress the soft magnetic powder layer 31 held between the different powder layers 32. Accordingly, the pressed powder 30 including the soft magnetic powder layer 31 and the different powder layers 32 is formed. The molding surface pressure is, for example, about 1000 MPa.

When the soft magnetic powder layer 31 is compressed, the lower punch 21 may be raised instead of lowering the upper punch 22, or the upper punch 22 may be lowered while the lower punch 21 is raised.

Last, as shown in FIGS. 1 and 4, the pressed powder 30 and the die 10 are slid relative to each other, thereby removing the pressed powder 30 from the die 10 (Step ST3).

To be more specific, as shown in FIG. 4, the die 10 is lowered while pressing the pressed powder 30 by the upper punch 22, thereby removing the pressed powder 30 from the die 10. At this time, the surface pressure applied to the pressed powder 30 by the upper punch 22 is called a holding-down surface pressure. The holding-down surface pressure is, for example, a pressure equal to or smaller than 10 MPa.

The shape of the pressed powder 30 is, for example, a columnar shape (including a disc shape). However, the shape of the pressed powder 30 is not particularly limited as long as it can be removed from the die 10. The shape of the pressed powder 30 may be, for example, polygonal, cylindrical or the like.

As shown in FIG. 4, in the pressed powder 30, the different powder layer 32 having a spring back rate higher than that of the soft magnetic powder layer 31 by 0.6% or more is formed on the upper and lower sides of the soft magnetic powder layer 31. Therefore, rubbing between the soft magnetic powder layer 31 and the die 10, which occurs when the pressed powder 30 is removed from the die 10, can be prevented. As a result, it is possible to prevent the insulating coating film of the soft magnetic powder from being broken and reduce the iron loss of the pressed powder 30.

Further, since the difference between the spring back rate of the soft magnetic powder layer 31 and that of the different powder layer 32 is 1.1% or smaller, cracking that occurs in the soft magnetic powder layer 31 when the pressed powder 30 is removed from the die 10 can also be prevented.

Therefore, it is possible to provide the method for manufacturing the powder magnetic core capable of reducing the iron loss thereof and having high formability.

The entire pressed powder 30 formed in Step ST3 may be used as a product. Alternatively, the different powder layer 32 may be removed from the pressed powder 30 and only the soft magnetic powder layer 31 may be used as a product. The different powder layer 32 may be removed, for example, by peeling or cutting.

Sub-steps ST12 and ST13 may be repeated a plurality of times, thereby forming the pressed powder 30 having a plurality of soft magnetic powder layers 31. In this case, the soft magnetic powder layers 31 and the different powder layers 32 are alternately formed. Therefore, the different powder layers 32 are formed on the upper and lower sides of each of the soft magnetic powder layers 31. Therefore, rubbing between the soft magnetic powder layer 31 and the die 10, which occurs when the pressed powder 30 is removed from the die 10, can be prevented. As a result, it is possible to prevent the insulating coating film of the soft magnetic powder from being broken and reduce the iron loss of the pressed powder 30.

After Step ST3, the entire pressed powder 30 or a pressed powder 30 made of only the soft magnetic powder layer 31 from which the different powder layer 32 is removed may be annealed under an inert atmosphere, although this treatment is not shown in the drawings. The annealing temperature is, for example, 600-800° C. By annealing the pressed powder 30 at 600° C. or higher, distortion accumulated during the compression molding is removed, which causes the magnetic performance to be improved. Further, by annealing the pressed powder 30 at 800° C. or lower, the insulating coating film can be prevented from being broken.

As described above, in the method for manufacturing the powder magnetic core according to this embodiment, before the pressed powder 30 is formed, the different powder layer 32 having a spring back rate that is higher than that of the soft magnetic powder layer 31 by 0.6% or more is formed on the upper and lower sides of the soft magnetic powder layer 31. Therefore, rubbing between the soft magnetic powder layer 31 and the die 10, which occurs when the pressed powder 30 is removed from the die 10 after it is formed, can be prevented. As a result, it is possible to prevent the insulating coating film of the soft magnetic powder from being broken and reduce the iron loss of the pressed powder 30.

Further, since the difference between the spring back rate of the soft magnetic powder layer 31 and that of the different powder layer 32 is equal to or smaller than 1.1%, cracking that occurs in the soft magnetic powder layer 31 when the pressed powder 30 is removed from the die 10 can also be prevented.

That is, it is possible to provide the method for manufacturing the powder magnetic core capable of reducing the iron loss thereof and having high formability.

<Regarding Spring Back Rate>

Figure 5:
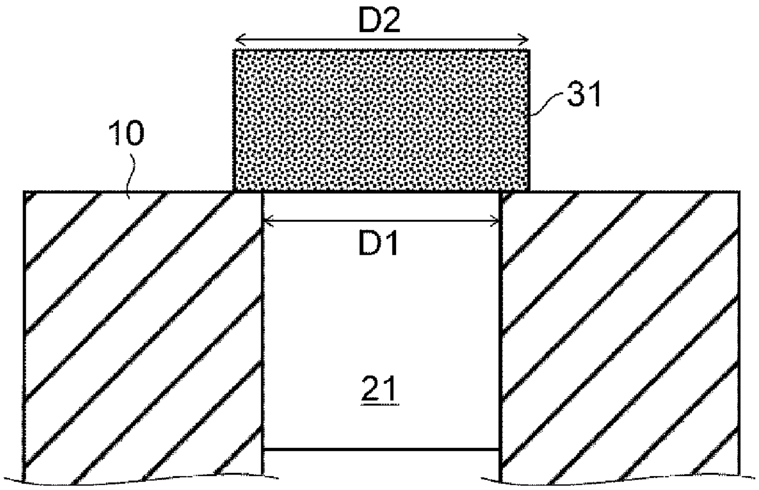
FIG. 5 is a schematic cross-sectional view for describing a spring back rate of a soft magnetic powder layer 31 and that of a different powder layer 32.

Referring next to FIG. 5, the definition and the measurement method of the spring back rate of the soft magnetic powder layer 31 and the spring back rate of the different powder layer 32 will be described. FIG. 5 is a schematic cross-sectional view for describing the spring back rate of the soft magnetic powder layer 31 and the spring back rate of the different powder layer 32.

FIG. 5 shows a relation between an inner diameter D1 of the die 10 and a diameter D2 of the columnar pressed powder made of only the soft magnetic powder layer 31 removed from the die 10. That is, due to the spring back that occurs when the pressed powder (the soft magnetic powder layer 31) is removed from the die 10, the diameter of the pressed powder (the soft magnetic powder layer 31) increases from D1 to D2.

The spring back rate of the pressed powder (the soft magnetic powder layer 31) can be defined by the following expression.

$$\text{Spring back rate (\%)}=(D2-D1)/D1\times 100$$

Here, since the diameter D2 of the pressed powder (the soft magnetic powder layer 31) fluctuates, the diameters at three parts including an upper part, a center part, and a lower part of the pressed powder (the soft magnetic powder layer 31) are each measured, for example, by a macrometer three times and the average value thereof is used as the diameter D2 of the pressed powder (the soft magnetic powder layer 31).

As shown in FIG. 5, the spring back rate of the soft magnetic powder layer 31 and that of the different powder layer 32 are measured separately from each other using a pressed powder made of the soft magnetic powder layer 31 alone or the different powder layer 32 alone. While the definition and the measurement method of the spring back rate of the soft magnetic powder layer 31 are shown in the example shown in FIG. 5, the same is also applicable to those of the different powder layer 32.

Since the spring back rate is changed depending on manufacturing conditions of the molding surface pressure, the holding-down surface pressure and the like, the spring back rate is measured for each of the manufacturing conditions.

EXAMPLES

Hereinafter, the method for manufacturing the powder magnetic core according to the first embodiment will be described in detail with reference to Examples and Comparative Examples. It should be noted, however, that the method for manufacturing the powder magnetic core according to the first embodiment is not limited to the following Examples.

Comparative Example 1

With reference to FIGS. 1 and 4, a method for manufacturing a powder magnetic core according to Comparative Example 1 will be described.

A pure iron (Fe) powder having a particle diameter of 150 μm and having a surface on which a phosphoric acid-based chemical conversion film having a thickness of 300 nm is formed as an insulating coating film was used as a soft magnetic powder.

First, as shown in FIG. 1, 40 g of the above pure iron powder was put into a space surrounded by the lower punch 21 and the die 10 (Step ST1). The inner diameter D1 of the die 10 was 29.76 mm. In Comparative Example 1, the different powder was not added. That is, Sub-steps ST11-ST13 shown in FIGS. 2 and 3 were not performed.

Next, as shown in FIGS. 1 and 4, the upper punch 22 was lowered and a columnar pressed powder 30 made of only the soft magnetic powder layer 31 was formed at a molding surface pressure of 900 MPa (Step ST2).

After that, as shown in FIGS. 1 and 4, the die 10 was lowered while pressing the pressed powder 30 at a holding-down surface pressure of 3.7 MPa by the upper punch 22, and the pressed powder 30 was removed from the die 10 (Step ST3).

When the pressed powder 30 (i.e., the soft magnetic powder layer 31) was removed from the die 10, no cracking occurred in the soft magnetic powder layer 31.

After annealing the pressed powder 30 under a nitrogen atmosphere at 750° C. for 30 minutes, the real part R of the impedance of the pressed powder 30 (i.e., the soft magnetic powder layer 31) was measured using an LCR meter. The measurement was performed with a frequency set at 20 kHz and a voltage set at 1 V. The ratio of the value of the real part R of the impedance in each of Comparative Examples 2 and 3 and Examples 1-7 was obtained using the value of the real part R of the impedance of the Comparative Example 1 that has been obtained. That is, the value of the real part R of the impedance according to Comparative Example 1 was used as a reference value.

Comparative Example 2

A pure copper (Cu) powder having a particle diameter of 5 μm was used as a different powder.

First, as shown in FIGS. 2 and 3, 30 g of a pure copper powder was put into a space surrounded by the lower punch 21 and the die 10 (Sub-step ST11). After that, preliminary compression of the different powder layer 32 was performed at a surface pressure of 3.7 MPa using the upper punch 22.

Next, as shown in FIGS. 2 and 3, 40 g of the pure iron powder, which is the same as that used in Comparative Example 1, was put into a space surrounded by the lower punch 21 and the die 10, thereby forming the soft magnetic powder layer 31 on the different powder layer 32 (Sub-step ST12). After that, preliminary compression of the soft magnetic powder layer 31 was performed at a surface pressure of 3.7 MPa using the upper punch 22.

Then, as shown in FIGS. 2 and 3, 30 g of a pure copper powder was put into a space surrounded by the lower punch 21 and the die 10 to form the different powder layer 32 on the soft magnetic powder layer 31 again (Sub-step ST13).

Next, as shown in FIGS. 1 and 4, the upper punch 22 was lowered and a columnar pressed powder 30 including the soft magnetic powder layer 31 held between the different powder layers 32 was formed at a molding surface pressure of 900 MPa (Step ST2).

After that, as shown in FIGS. 1 and 4, the die 10 was lowered while pressing the pressed powder 30 by the upper punch 22 at a holding-down surface pressure of 2.8 MPa, thereby removing the pressed powder 30 from the die 10 (Step ST3).

When the pressed powder 30 was removed from the die 10, no cracking occurred in the soft magnetic powder layer 31.

The difference between the spring back rate of the soft magnetic powder layer 31 and that of the different powder layer 32 was 0.50%.

The definition and the measurement method of the spring back rate have been described above. To be more specific, a pressed powder made of 40 g of a pure iron powder alone used to prepare the pressed powder 30 was formed at the molding surface pressure (900 MPa) and the holding-down surface pressure (2.8 MPa) just like in the above example, and the resulting pressed powder was removed. The spring back rate of the soft magnetic powder layer 31 was measured using a pressed powder made of only the soft magnetic powder layer 31.

Likewise, a pressed powder made of 30 g of a pure copper powder alone used to prepare the pressed powder 30 was formed at the molding surface pressure (900 MPa) and the holding-down surface pressure (2.8 MPa) just like in the above example, and the resulting pressed powder was removed. The spring back rate of the different powder layer 32 was measured using the pressed powder made of only the different powder layer 32.

Next, after the different powder layer 32 was peeled from the pressed powder 30, the pressed powder 30 (i.e., the soft magnetic powder layer 31) was annealed under a nitrogen atmosphere at 750° C. for 30 minutes. After that, the real part R of the impedance of the pressed powder 30 (i.e., the soft magnetic powder layer 31) was measured under the conditions the same as those in Comparative Example 1 using an LCR meter. The rate of the real part R of the impedance as compared to that in Comparative Example 1 was 1.05 and the iron loss increased.

Example 1

The pressed powder 30 was prepared in a way similar to that in Comparative Example 2 except that the holding-down surface pressure when the pressed powder 30 was removed from the die 10 was changed to 3.7 MPa. The difference between the spring back rate of the soft magnetic powder layer 31 and that of the different powder layer 32 was 0.60%.

The difference between Comparative Example 2 and Example 1 is that the holding-down surface pressure was raised from 2.8 MPa to 3.7 MPa in Example 1 although the soft magnetic powder layer 31 and the different powder layer 32 are made of a common material. It can therefore be considered that the difference in the spring back rate was also raised from 0.50% to 0.60%.

When the pressed powder 30 was removed from the die 10, no cracking occurred in the soft magnetic powder layer 31.

Next, after the different powder layer 32 was peeled from the pressed powder 30, the pressed powder 30 (i.e., the soft magnetic powder layer 31) was annealed under a nitrogen atmosphere at 750° C. for 30 minutes. After that, the real part R of the impedance of the pressed powder 30 (i.e., the soft magnetic powder layer 31) was measured under the conditions the same as those in Comparative Example 1 using an LCR meter. The rate of the real part R of the impedance as compared to that in Comparative Example 1 was 0.95 and the iron loss was reduced from that in Comparative Example 1.

Example 2

The pressed powder 30 was prepared in a way similar to that in Example 1 except that the holding-down surface pressure when the pressed powder 30 was removed from the die 10 was changed to 7.4 MPa. The difference between the spring back rate of the soft magnetic powder layer 31 and that of the different powder layer 32 was 0.70%.

While the soft magnetic powder layer 31 and the different powder layer 32 are made of a common material in Examples 1 and 2, the holding-down surface pressure was raised from 3.7 MPa to 7.4 MPa in Example 2. It can therefore be considered that the difference in the spring back rate was also raised from 0.60% to 0.70%.

When the pressed powder 30 was removed from the die 10, no cracking occurred in the soft magnetic powder layer 31.

Next, after the different powder layer 32 was peeled from the pressed powder 30, the pressed powder 30 (i.e., the soft magnetic powder layer 31) was annealed under a nitrogen atmosphere at 750° C. for 30 minutes. After that, the real part R of the impedance of the pressed powder 30 (i.e., the soft magnetic powder layer 31) was measured under the conditions the same as those in Comparative Example 1 using an LCR meter. The rate of the real part R of the impedance as compared to that in Comparative Example 1 was 0.94 and the iron loss was reduced from that in Comparative Example 1.

Example 3

The pressed powder 30 was prepared in a way similar to that in Example 2 except that the molding surface pressure was changed to 1000 MPa. The difference between the spring back rate of the soft magnetic powder layer 31 and that of the different powder layer 32 was 0.75%.

While the soft magnetic powder layer 31 and the different powder layer 32 are made of a common material in Examples 2 and 3, the molding surface pressure was raised from 900 MPa to 1000 MPa in Example 3. It can therefore be considered that the difference in the spring back rate was also raised from 0.70% to 0.75%.

When the pressed powder 30 was removed from the die 10, no cracking occurred in the soft magnetic powder layer 31.

Next, after the different powder layer 32 was peeled from the pressed powder 30, the pressed powder 30 (i.e., the soft magnetic powder layer 31) was annealed under a nitrogen atmosphere at 750° C. for 30 minutes. After that, the real part R of the impedance of the pressed powder 30 (i.e., the soft magnetic powder layer 31) was measured under the conditions the same as those in Comparative Example 1 using an LCR meter. The rate of the real part R of the impedance as compared to that in Comparative Example 1 was 0.80 and the iron loss was reduced from that in Comparative Example 1.

Example 4

The pressed powder 30 was prepared in a way similar to that in Comparative Example 2 except that 30 g of an alumina ($Al_2O_3$) powder having a particle diameter of 50 μm was used as a different powder. The difference between the spring back rate of the soft magnetic powder layer 31 and that of the different powder layer 32 was 0.83%.

When Comparative Example 2 is compared with Example 4, it can be considered that, since the different powder was changed from a pure copper powder to an alumina powder, the difference in the spring back rate was raised from 0.50% to 0.83%. In this manner, by using the ceramic powder as the different powder, the difference between the spring back rate of the soft magnetic powder layer and that of the different powder layer can easily be made large.

When the pressed powder 30 was removed from the die 10, no cracking occurred in the soft magnetic powder layer 31.

Next, after the different powder layer 32 was peeled from the pressed powder 30, the pressed powder 30 (i.e., the soft magnetic powder layer 31) was annealed under a nitrogen atmosphere at 750° C. for 30 minutes. After that, the real part R of the impedance of the pressed powder 30 (i.e., the soft magnetic powder layer 31) was measured under the conditions the same as those in Comparative Example 1 using an LCR meter. The rate of the real part R of the impedance as compared to that in Comparative Example 1 was 0.25 and the iron loss was significantly reduced from that in Comparative Example 1.

Example 5

The pressed powder 30 was prepared in a way similar to that in Example 4 except that the holding-down surface pressure when the pressed powder 30 was removed from the die 10 was changed to 3.7 MPa. The difference between the spring back rate of the soft magnetic powder layer 31 and that of the different powder layer 32 was 0.95%.

While the soft magnetic powder layer 31 and the different powder layer 32 are made of a common material in Examples 4 and 5, the holding-down surface pressure was raised from 2.8 MPa to 3.7 MPa in Example 5. It can therefore be considered that the difference in the spring back rate was also raised from 0.83% to 0.95%.

When the pressed powder 30 was removed from the die 10, no cracking occurred in the soft magnetic powder layer 31.

Next, after the different powder layer 32 was peeled from the pressed powder 30, the pressed powder 30 (i.e., the soft magnetic powder layer 31) was annealed under a nitrogen atmosphere at 750° C. for 30 minutes. After that, the real part R of the impedance of the pressed powder 30 (i.e., the soft magnetic powder layer 31) was measured under the conditions the same as those in Comparative Example 1 using an LCR meter. The rate of the real part R of the impedance as compared to that in Comparative Example 1 was 0.20 and the iron loss was significantly reduced from that in Comparative Example 1, like in Example 4.

Example 6

The pressed powder 30 was prepared in a way similar to that in Example 5 except that the holding-down surface pressure when the pressed powder 30 was removed from the die 10 was changed to 5.6 MPa. The difference between the spring back rate of the soft magnetic powder layer 31 and that of the different powder layer 32 was 1.0%.

While the soft magnetic powder layer 31 and the different powder layer 32 are made of a common material in Examples 5 and 6, the holding-down surface pressure was raised from 3.7 MPa to 5.6 MPa in Example 6. It can therefore be considered that the difference in the spring back rate was also raised from 0.95% to 1.0%.

When the pressed powder 30 was removed from the die 10, no cracking occurred in the soft magnetic powder layer 31.

Next, after the different powder layer 32 was peeled from the pressed powder 30, the pressed powder 30 (i.e., the soft magnetic powder layer 31) was annealed under a nitrogen atmosphere at 750° C. for 30 minutes. After that, the real part R of the impedance of the pressed powder 30 (i.e., the soft magnetic powder layer 31) was measured under the conditions the same as those in Comparative Example 1 using an LCR meter. The rate of the real part R of the impedance as compared to that in Comparative Example 1 was 0.18 and the iron loss was significantly reduced from that in Comparative Example 1, like in Example 5.

Example 7

The pressed powder 30 was prepared in a way similar to that in Example 6 except that the holding-down surface pressure when the pressed powder 30 was removed from the die 10 was changed to 7.4 MPa. The difference between the spring back rate of the soft magnetic powder layer 31 and that of the different powder layer 32 was 1.1%.

While the soft magnetic powder layer 31 and the different powder layer 32 are made of a common material in Examples 6 and 7, the holding-down surface pressure was raised from 5.6 MPa to 7.4 MPa in Example 7. Therefore, it is considered that the difference in the spring back rate was also raised from 1.0% to 1.1%.

When the pressed powder 30 was removed from the die 10, no cracking occurred in the soft magnetic powder layer 31.

Next, after the different powder layer 32 was peeled from the pressed powder 30, the pressed powder 30 (i.e., the soft magnetic powder layer 31) was annealed under a nitrogen atmosphere at 750° C. for 30 minutes. After that, the real part R of the impedance of the pressed powder 30 (i.e., the soft magnetic powder layer 31) was measured under the conditions the same as those in Comparative Example 1 using an LCR meter. The rate of the real part R of the impedance as compared to that in Comparative Example 1 was 0.21 and the iron loss was significantly reduced from that in Comparative Example 1, like in Example 6.

Comparative Example 3

The pressed powder 30 was prepared in a way similar to that in Example 7 except that the molding surface pressure was changed to 1000 MPa. The difference between the spring back rate of the soft magnetic powder layer 31 and that of the different powder layer 32 was 1.2%.

While the soft magnetic powder layer 31 and the different powder layer 32 are made of a common material in Example 7 and Comparative Example 3, the molding surface pressure was raised from 900 MPa to 1000 MPa in Comparative Example 3. It can therefore be considered that the difference in the spring back rate was also raised from 1.1% to 1.2%.

When the pressed powder 30 was removed from the die 10, cracking occurred in the soft magnetic powder layer 31. It is considered that this is because the difference in the spring back rate is too large.

Next, after the different powder layer 32 was peeled from the pressed powder 30, the pressed powder 30 (i.e., the soft magnetic powder layer 31) was annealed under a nitrogen atmosphere at 750° C. for 30 minutes. After that, the real part R of the impedance of the pressed powder 30 (i.e., the soft magnetic powder layer 31) was measured under the conditions the same as those in Comparative Example 1 using an LCR meter. The rate of the real part R of the impedance as compared to that in Comparative Example 1 was 0.17 and the iron loss was significantly reduced from that in Comparative Example 1, like in Example 7.

Table 1 collectively shows experimental conditions and results in Comparative Examples 1-3 and Examples 1-7.

TABLE 1

| | Soft magnetic powder | Different powder | Molding surface pressure [MPa] | HD surface pressure [MPa] | Difference in SB rate [%] | Rate of R | Cracking |
|---|---|---|---|---|---|---|---|
| Comparative Example 1 | Fe | — | 900 | 3.7 | — | Reference | No |
| Comparative Example 2 | Fe | Cu | 900 | 2.8 | 0.50 | 1.05 | No |
| Comparative Example 3 | Fe | $Al_2O_3$ | 1000 | 7.4 | 1.2 | 0.17 | Yes |
| Example 1 | Fe | Cu | 900 | 3.7 | 0.60 | 0.98 | No |
| Example 2 | Fe | Cu | 900 | 7.4 | 0.70 | 0.94 | No |
| Example 3 | Fe | Cu | 1000 | 7.4 | 0.75 | 0.80 | No |

TABLE 1-continued

| | Soft magnetic powder | Different powder | Molding surface pressure [MPa] | HD surface pressure [MPa] | Difference in SB rate [%] | Rate of R | Cracking |
|---|---|---|---|---|---|---|---|
| Example 4 | Fe | $Al_2O_3$ | 900 | 2.8 | 0.83 | 0.25 | No |
| Example 5 | Fe | $Al_2O_3$ | 900 | 3.7 | 0.95 | 0.20 | No |
| Example 6 | Fe | $Al_2O_3$ | 900 | 5.6 | 1.0 | 0.18 | No |
| Example 7 | Fe | $Al_2O_3$ | 900 | 7.4 | 1.1 | 0.21 | No |

Table 1 shows the soft magnetic powder, the different powder, the molding surface pressure [MPa], the holding-down (HD) surface pressure [MPa], the difference [%] in the spring back (SB) rate, the rate of the real part R of the impedance as compared to that in Comparative Example 1, and the presence or absence of cracking.

Figure 6:
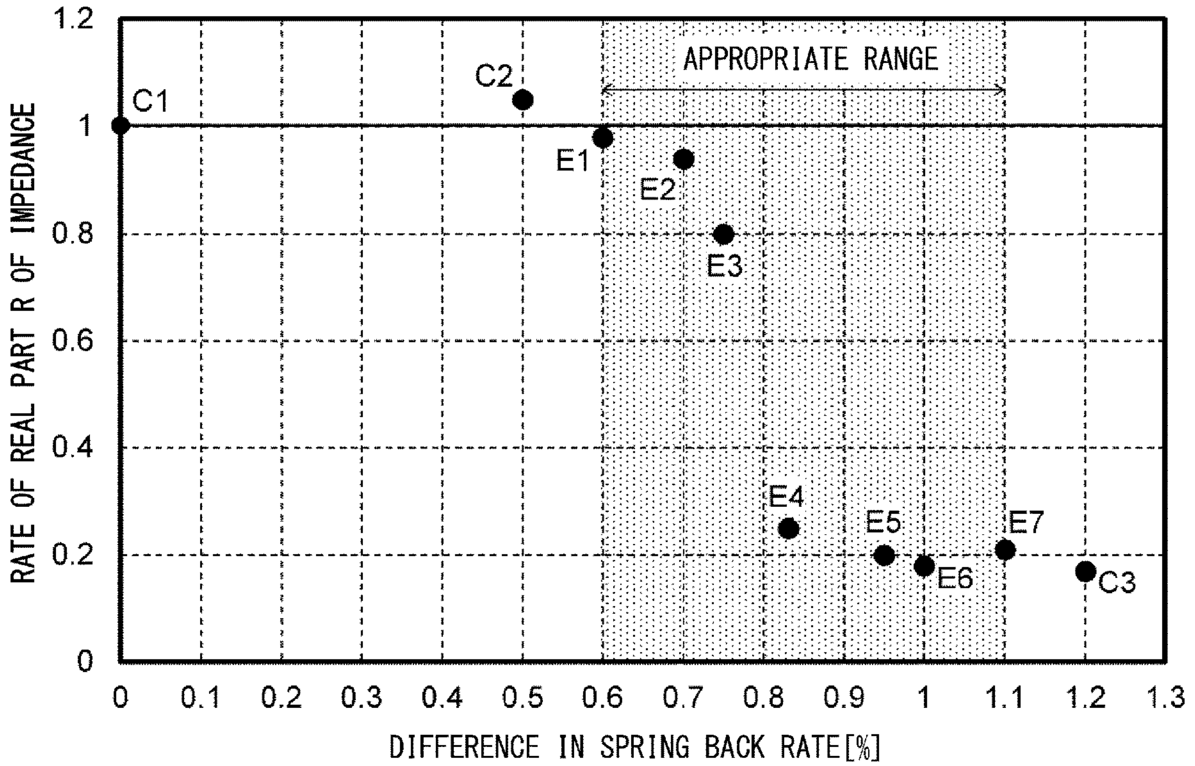
FIG. 6 is a graph showing a relation between a difference in the spring back rate (horizontal axis) and a rate of a real part R of impedance as compared to that in Comparative Example 1 (vertical axis).

Further, FIG. 6 is a graph showing a relation between the difference in the spring back rate (horizontal axis) and the rate of the real part R of the impedance as compared to that in Comparative Example 1 (vertical axis).

In FIG. 6, data points in Comparative Examples 1-3 are respectively shown by C1-C3. Data points in Examples 1-7 are respectively shown by E1-E7.

As shown in Table 1 and FIG. 6, by setting the difference in the spring back rate to 0.6% or larger, the rate of the real part R of the impedance as compared to that in Comparative Example 1 became smaller than 1 and the iron loss was successfully reduced. In particular, by setting the difference in the spring back rate to 0.8% or larger, the rate of the real part R of the impedance as compared to that in Comparative Example 1 was below 0.3 and the iron loss was significantly reduced.

On the other hand, as shown in Table 1, in Comparative Example 3, the difference in the spring back rate was 1.2%, which was too large, and cracking occurred in the soft magnetic powder layer 31 when the pressed powder 30 was removed from the die 10. In other words, by setting the difference in the spring back rate to 1.1% or smaller, cracking that occurs in the soft magnetic powder layer 31 was prevented.

That is, it is shown in FIG. 6 that, it is possible to provide the method for manufacturing the powder magnetic core capable of reducing the iron loss thereof and having high formability by setting the difference between the spring back rate of the soft magnetic powder layer 31 and that of the different powder layer 32 to 0.6-1.1%.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for manufacturing a powder magnetic core, the method comprising:

forming a pure iron powder layer by putting a soft magnetic pure iron powder having a particle diameter of 10 to 250 μm and having a surface on which an insulating coating film is formed into a space surrounded by a lower punch and a die, the insulating coating film being a phosphoric acid-based chemical conversion film or a silicic acid-based chemical conversion film;

forming a pressed powder by compressing the pure iron powder layer in the die by the lower punch and an upper punch;

causing the pressed powder and the die to slide relative to each other and then removing the pressed powder from the die, wherein in forming the pure iron powder layer, a pure copper powder having a particle diameter of 1 to 250 μm is put into the space before and after the pure iron powder is put into the space and a pure copper powder layer having a spring back rate higher than that of the pure iron powder layer by 0.6-1.1% is formed on upper and lower sides of the pure iron powder layer;

preliminarily compressing the pure copper powder layer in the die by the lower punch and the upper punch after forming the pure copper powder layer by putting the pure copper powder into the space before putting the pure iron powder into the space; and preliminarily compressing the pure iron powder layer in the die by the lower punch and the upper punch after forming the pure iron powder layer on the pure copper powder layer by putting the pure iron powder into the space before putting the pure copper powder into the space again.

* * * * *